United States Patent [19]

Evans et al.

[11] Patent Number: 5,503,893
[45] Date of Patent: Apr. 2, 1996

[54] ULTRA-HIGH PERFORMANCE CARBON COMPOSITES

[75] Inventors: Maurice J. Evans, Lichfield; Ronald Fisher, Rugby; Keith A. Williams, Coventry, all of England

[73] Assignee: Dunlop Limited, United Kingdom

[21] Appl. No.: 246,228

[22] Filed: May 18, 1994

[30] Foreign Application Priority Data

May 22, 1993 [GB] United Kingdom ............... 9310592

[51] Int. Cl.$^6$ .............. B32B 5/06; B32B 31/16; B32B 31/26; D01F 9/12; D04H 5/02

[52] U.S. Cl. .............. 428/110; 28/107; 28/112; 28/115; 244/110 A; 264/29.2; 376/327; 376/339; 376/904; 423/447.1; 423/447.2; 428/111; 428/114; 428/212; 428/284; 428/294; 428/300; 428/408

[58] Field of Search ............... 28/107, 112, 115; 244/110 A; 204/29.2; 376/327, 339, 904; 423/447.1, 447.2; 428/110, 111, 114, 212, 284, 294, 300, 408

[56] References Cited

U.S. PATENT DOCUMENTS 5,283,113  2/1994  Nishimura ............... 428/300
5,336,557  8/1994  Takamatsu ............... 428/300

FOREIGN PATENT DOCUMENTS 47-020468  9/1972  Japan.
2012671    8/1979  United Kingdom.
2199856    7/1988  United Kingdom.

*Primary Examiner*—James C. Cannon
*Attorney, Agent, or Firm*—Stevens, Davis, Miller & Mosher

[57] ABSTRACT

Method of fabricating a multi-ply carbon fibre fabric, preform or composite material from a layer of unidirectionally aligned carbon fibres of ultra-high modulus and a layer of low modulus carbon fibre comprising the steps of: arranging in superimposed relationship the layer of unidirectionally aligned carbon fibres of ultra-high modulus and the layer of low modulus carbon fibres so that at least a substantial number of the fibres of low modulus are disposed transversely of the fibres of the ultra-high modulus fibre layer, and connecting the two layers by interlacing fibres of the layer of low modulus fibres with those of the layer of ultra-high modulus fibres by needle-punching using felting needles orientated and configured so that their barbs snag only the low modulus fibres during passage through the layers.

16 Claims, 3 Drawing Sheets

ULTRA-HIGH PERFORMANCE CARBON COMPOSITES

This invention relates to ultra-high performance multi-ply carbon fabrics, preforms and composite materials generally and, more particularly although not exclusively, to a multi-ply fabric, preform or composite comprising a ply of carbon fibres which have a high thermal conductivity. Such fibres also have a high elastic modulus. It relates also to the manufacture of such fabrics, preforms and composite materials.

Carbon fibre composite materials are used increasingly for structural components in the aerospace industry because of their high specific strength (the combination of high material strength and low density). The matrix materials in such composites may be either a resin or may comprise a carbon material produced by a carbonisation process. However there are applications such as in the field of aircraft brakes and in the thermonuclear fusion industry where a carbon fibre reinforced composite having high thermal conductivity and low thermal expansion characteristics is desired.

In recent years there have been available ultra-high modulus carbon fibres such as fibres with at least 100% greater stiffness (e.g. Amoco P120 and P130 fibres) than those (e.g. Amoco P55) of a decade ago. These ultra-high modulus fibres also have high thermal conductivity making them ideal for applications such as in the thermonuclear fusion industry. Unfortunately the cost of these materials is far higher than previously available fibres. Typically, these ultra-high modulus fibres cost some $5400 per kilogramme as compared to low modulus fibres costing about $88 per kilogramme. In addition a composite structure comprising only unidirectional ultra-high modulus fibres has low flexural strength, low tensile strength and negligible thermal conductivity in directions perpendicular to the unidirectionally aligned fibres.

Consequently, in order better to utilise the new materials in a cost efficient manner hybrid composites have been developed which comprise the ultra-high modulus fibres aligned parallel to one another within a multi-ply fabric, preform or composite in combination with piles of the low modulus and cheaper fibres. In proposing such laminate or multi-ply composites it has been appreciated that an effective laminated structure requires that the aligned fibres in each adjacent ply are laid transversely of one another, The separate ply-sheets of ultra-high modulus carbon fibres and low modulus carbon fibres are both conveniently produced by the method disclosed in the specification of our United Kingdom Patent No. GB 2199856.

A disadvantage of such hybrid laminated composites is that under compression, delamination may occur before the true strength of the fibres can be realised. A further disadvantage is that, although thermal conductivity along the ultra-high modulus fibres is better than along the low modulus fibres, conductivity between the plies, ie: in directions perpendicular to the planes of the respective plies, is not good.

It has been suggested that the fibres of confronting laminates could be interlaced by well know needle-punching techniques. Such techniques are described In the Specifications of our United Kingdom Patents Nos. 2012671 and 2199856. In the specification of United Kingdom Patent No. 2012671 there is disclosed a method of fabricating a carbon composite, suitable for manufacturing aircraft brake discs, comprising first manufacturing a fabric of oxidized polyacrylonitrile fibres, carbonising the fabric and embedding the carbonised fabric in a carbon matrix.

Unfortunately, in practice It has been found that applying the aforedisclosed needle-punching techniques to hybrid carbon fibre composites comprising ultra-high modulus fibres results in breakage of the ultra-high modulus fibres.

It is an object of the invention to provide a method of fabricating a multi-ply carbon fibre fabric, preform or composite material comprising ultra-high modulus fibres which mitigates or overcomes some or all of the aforementioned disadvantages.

According to a first aspect of the invention a method of fabricating a multi-ply carbon fibre fabric, preform or composite material from a layer of unidirectionally aligned carbon fibres of ultra-high modulus and a layer of low modulus carbon fibre, comprises the steps of:

arranging in superimposed relationship the layer of unidirectionally aligned carbon fibres of ultra-high modulus and the layer of low modulus carbon fibres so that at least a substantial number of the fibres of the low modulus layer are disposed transversely of the fibres of the ultra-high modulus fibre layer, and connecting the two layers by interlacing fibres of the layer of low modulus fibres with those of the layer of ultra-high modulus fibres by needle-punching using felting needles orientated and configured so that their barbs snag only the low modulus fibres during passage through the layers.

It is envisaged by the present invention that the two layers will be interconnected only by those of the carbon fibres which are of said low modulus.

The multi-ply carbon fibre fabric produced by the aforedescribed method may be used as a preform, in that case the preform typically comprising a plurality of layers of fibres of ultra high modulus and a plurality of layers of fibres of low modulus which have been superimposed for needle punching with the ultra-high modulus fibres of the respective layers being substantially aligned.

Alternatively, a preform may be manufactured by providing a plurality of pieces of multi-ply carbon fibre fabric manufactured in accordance with the invention, superimposing said pieces with the ultra-high modulus fibres of the respective pieces being substantially aligned and then connecting the pieces by needle-punching using felting needles orientated and configured so that their barbs snag only the low modulus fibres during passage through the pieces.

In a preform, of a fabric comprising a plurality of layers of ultra-high modulus fibres and a plurality of layers of low modulus material, it is required that the ultra-high modulus fibres of one layer shall be substantially aligned with those in other layers. However, the low modulus fibres in one layer need not be aligned with those in other layers, and may be provided at pre-selected different angles of orientation.

For the manufacture of a composite the method of the invention as applied to the manufacture of a fabric or preform may further comprise consolidating the fabric or preform by a chemical vapour deposition process or by impregnation by a resin or pitch-based matrix material and then a matrix consolidation process and carbonising the resulting assembly.

The layer of low modulus fibres may be provided by a mat in which most of the fibres are aligned and disposed generally perpendicularly to the fibres of the layer of unidirectionally aligned carbon fibres of ultra-high modulus. Suitably, the fibres of the high modulus array are provided by a plurality of continuous filament tows let off from a creel, beam, plated box or coil cans and fed through suitable guides, tension control and tow-spreading means.

Additionally, the low modulus fibres may have a modulus in the range of 35 to 175 GPa (Giga Pascals) and the ultra-high modulus fibres may have a modulus in the order of 700 to 900 GPa. It is believed that needling action imposed on fibres which have a modulus greater than 175 GPa results in excessive breakage of the fibres because of the impacting action on the fibres by the needle barbs.

According to a second aspect of the invention a multi-ply carbon fibre fabric, preform or composite material having an ultra-high thermal conductivity In one direction is fabricated by a method in accordance with the first aspect of the invention. After having been subjected to a subsequent heat treatment the carbon—carbon composite material may have thermal conductivity values in a specific direction in the order of 250 W/m.K at temperatures in excess of 500 degrees Celsius.

Embodiments of the invention will now be described by way of example only with reference to the accompanying drawings in which.

Figure 1:
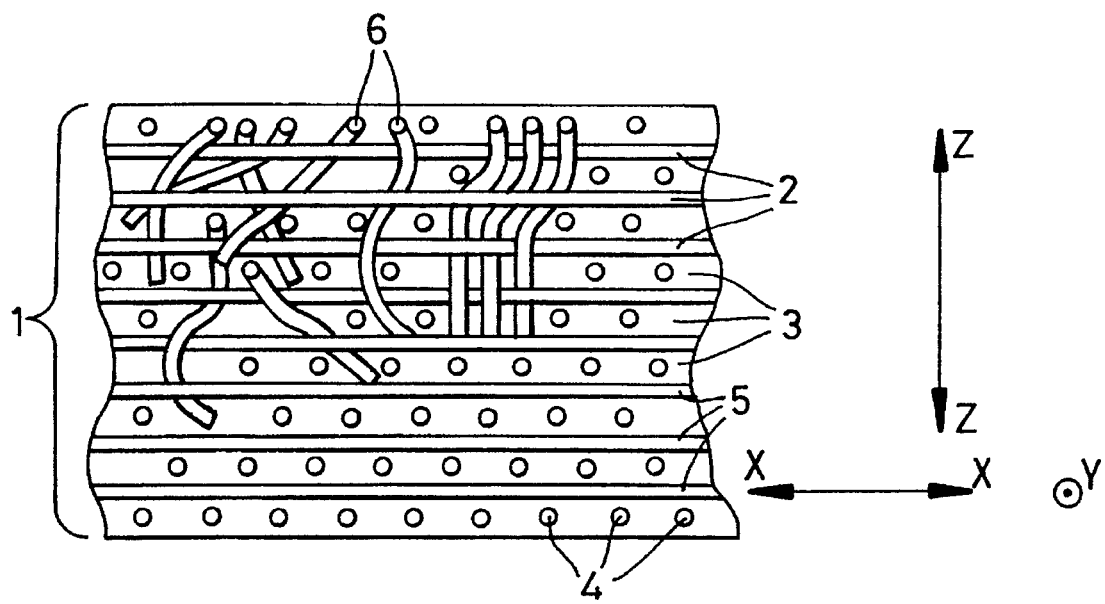
FIG. 1 illustrates diagrammatically the Interlacing of low modulus carbon fibres with ultra-high modulus carbon fibres to manufacture a multi-layer preform.
Figure 3:
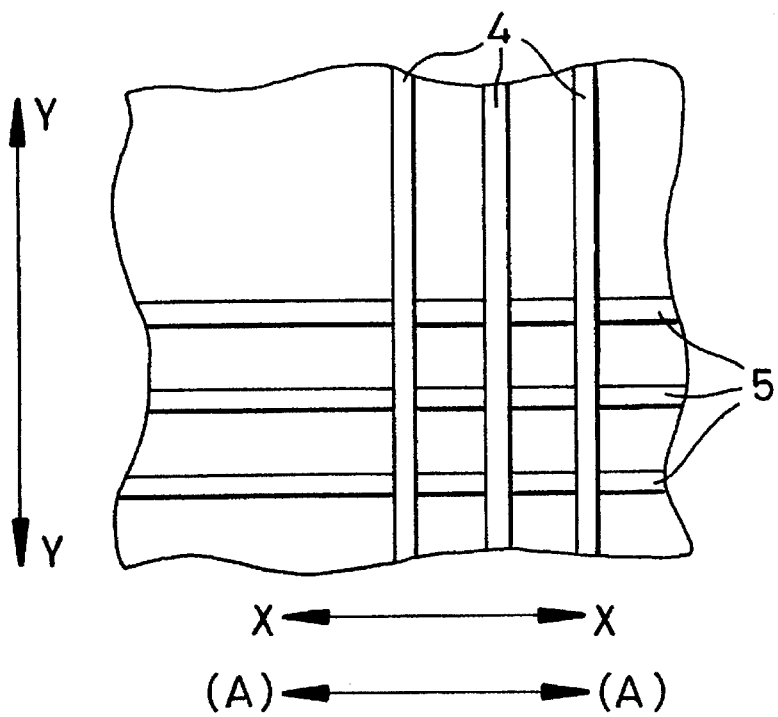
FIG. 3 illustrates in cross section the Internal arrangement of the ultra-high modulus carbon fibres and the low modulus fibres prior to the needling.
Figure 4:
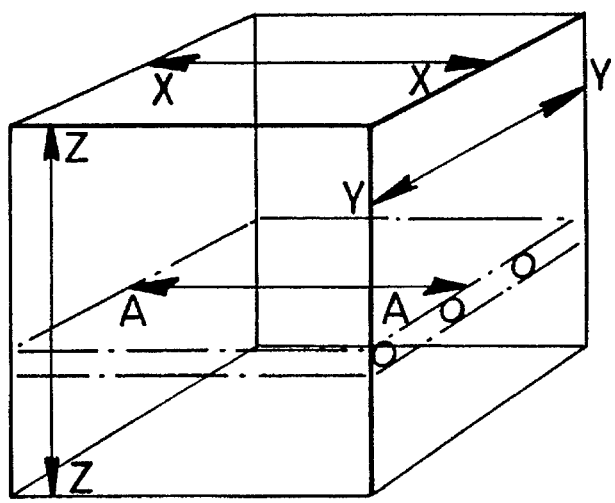
Figure 5:
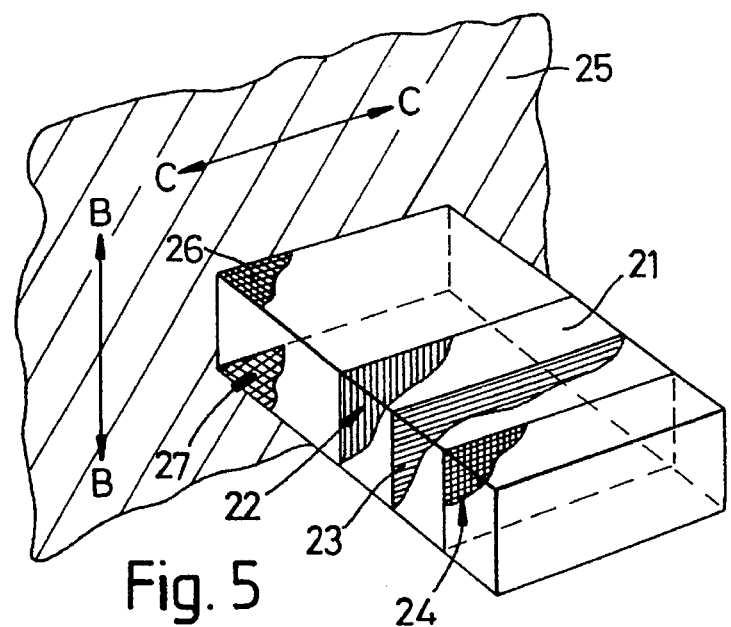
Figure 6:
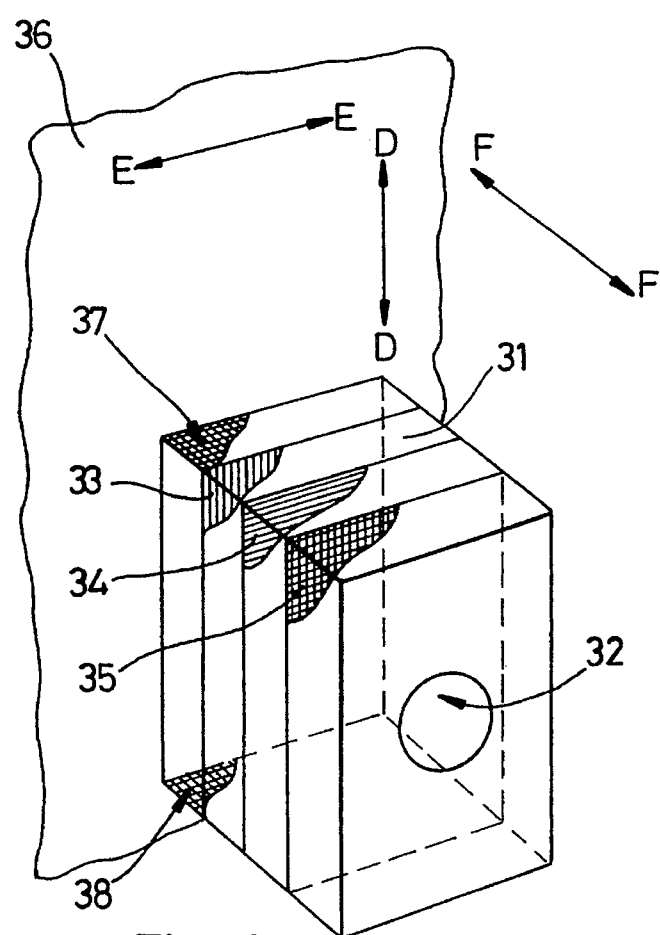

FIG. 4 identifies the relative orientations of the directions shown in FIGS. 1 and 3;

FIG. 5 illustrates the orientation of the fibres in a material of high thermal conductivity for use as a tile in a thermonuclear fusion reactor, and FIG. 6 illustrates another form of tile which is for use with an internal cooling tube.

An improved carbon—carbon multi-ply composite material 1 is fabricated from layers 2 of unidirectionally aligned carbon fibres 5 of ultra-high modulus and layers 3 of low modulus carbon fibres 4.

Figure 2:
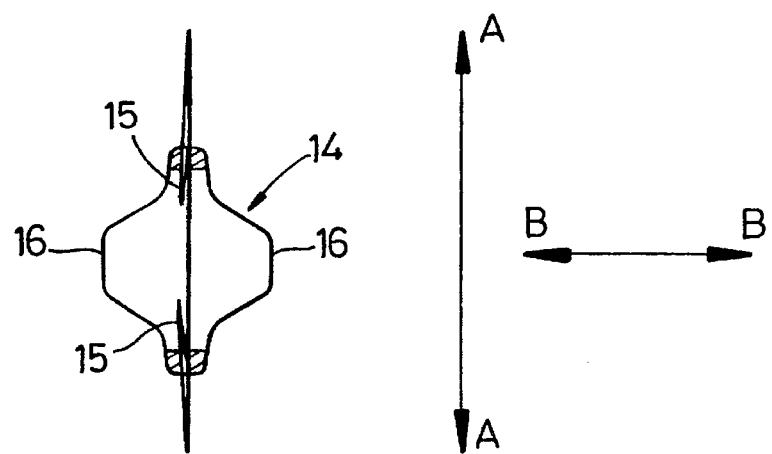
FIG. 2 illustrates in cross section a needle used in needle-punching aspects of the invention.

The low modulus layers 3 are laid upon and interleaved with the layers 2 so that a majority of all of the fibres 4 are aligned transversely of the ultra-high modulus fibres 5 along or parallel to the axis Y—Y shown on FIG. 3. Some fibres 6 within the layer 3 of low modulus fibres 4 are caused to interlace the fibres 5 of the layer 2 (as shown in FIG. 1) by needle-punching using needles having the cross section illustrated in FIG. 2. Each of these needles similarly to needle 14 shown in FIG. 2 has a cross section having a major axis A—A and a minor axis B—B with barbs 15 formed only along the edges of the body portion at the opposite ends of the major axis.

During the needle-punching operation the needles are disposed so that their major axes A—A are parallel to or aligned with the axis X—X shown in FIGS. 1 and 3. Consequently, when needle 14 passes through the ultra-high modulus layer 2 the corners 16 of its minor axis tend to displace laterally adjacent ultra-high modulus fibres 5 of the sheet 2 between which it passes freely, whilst its barbs 15 snag and displace in the z-direction transversely orientated fibres 4 of the low modulus layer 3 effecting in known fashion interlacing with the fibres 5 of the layer 2, the displaced fibres being shown as fibres 6 in FIG. 1.

The combined structure of ultra-high and low modulus fibres can, subsequent to the needle-punching operation, be subjected to a carbonisation process to form the carbon—carbon composite material. Suitable processes include C.V.D. (Carbon vapour deposition), pitch or resin impregnation. A material can be formed which because of the connection between the ultra-high and the low modulus fibres provides very high thermal conductivity in a direction parallel to the orientation of the ultra-high modulus fibres 5 of the layer 2. Typically, by appropriate choice of materials, it is believed to be possible to obtain a thermal conductivity of at least 250/m.K in the X-direction, 100–125 W/m.K in the Y-direction and 25–50 W/m.K in the Z-direction.

It will be appreciated that although many of the low modulus fibres 3 must be laid transversely of the aligned ultra-high modulus fibres 5 of the layer 2 they need not be perpendicular thereto.

A material in accordance with the present invention may be used as thermal protection means in a thermonuclear fusion reactor, FIG. 5 shows a tile 21 in which the ultra-high modulus fibres 22 are aligned in the direction BB and the low modulus fibres 23 are aligned in the direction CC with the fibre layers 24 laid up parallel to the plane 25. Thus heat can be rapidly transferred from the face 26 to the face 27 which lies at an opposite side of the tile.

FIG. 6 shows a tile 31 containing a cooling passage 32 in which the ultra-high modulus fibres 33 are aligned in the direction DD and the low modulus fibres 34 are aligned in the direction EE with the fibre layers 35 laid up parallel to the plane 36. In this configuration heat can be rapidly extracted from oppositely disposed surfaces 37 or 38, but moderately high thermal conductivity in the direction EE is also desirable. High thermal conductivity in the direction FF is unimportant as heat transfer in this direction is provided by means of flow of a cooling fluid within a cooling tube (not illustrated) contained within the cooling passage 32.

The materials herein described may be used to provide highly directional means of managing heat flow in specific directions within aircraft brakes and may, for example, be used as a hollow cylindrical liner to conduct heat flow within a brake chassis.

The materials of the invention may be used for land and air based applications and also for space applications.

What we claim is:

1. A method of fabricating a multi-ply carbon fibre fabric, preform or composite material from a layer of unidirectionally aligned carbon fibres of ultra-high modulus and a layer of low modulus carbon fibre, comprising the steps of:

arranging in superimposed relationship the layer of unidirectionally aligned carbon fibres of ultra-high modulus and the layer of low modulus carbon fibres so that at least a substantial number of the fibres of the low modulus layer are disposed transversely of the fibres of the ultra-high modulus fibre layer, and connecting the two layers by interlacing fibres of the layer of low modulus fibres with those of the layer of ultra-high modulus fibres by needle-punching using felting needles orientated and configured so that their barbs snag only the low modulus fibres during passage through the layers.

2. A method in accordance with claim 1 as applied to the manufacture of a fabric or preform further comprising the step of consolidating the fabric or preform by a chemical vapour deposition process or by Impregnation by a resin or pitch-based matrix material and then a matrix consolidation process end carbonising the resulting assembly.

3. A preform manufactured in accordance with claim 1 comprising a plurality of layers of fibres of ultra high modulus and a plurality of layers of fibres of low modulus which have been superimposed for needle punching with the ultra-high modulus fibres of the respective layers being substantially aligned.

4. A preform manufactured by providing a plurality of pieces of multi-ply carbon fibre fabric manufactured in accordance with the method of claim 1 superimposing said pieces with the ultra-high modulus fibres of the respective pieces being substantially aligned and then connecting the pieces by needle-punching using felting needles orientated and configured so that their barbs snag only the low modulus fibres during passage through the pieces.

5. A preform in accordance with claim 4 comprising a fabric having a plurality of layers of ultra-high modulus fibres and a plurality of layers of low modulus material, in which the ultra-high modulus fibres of one layer are substantially aligned with those In other layers.

6. A preform in accordance with claim 4 comprising a fabric having a plurality of layers of ultra-high modulus fibres and a plurality of layers of low modulus material, in which the low modulus fibres in one layer are not aligned with those in other layers.

7. A preform in accordance with claim 6, in which layers of said low modulus fibres are provided so that fibres of different layers are disposed at pre-selected different angles of orientation.

8. A preform in accordance with claim 3 in which the layer of low modulus fibres is provided by a mat in which most of the fibres are aligned and disposed generally perpendicularly to the fibres of the layer of unidirectionally aligned carbon fibres of ultra-high modulus.

9. A method in accordance with claim 1 in which the fibres of the high modulus array are provided by a plurality of continuous filament tows let off from a creel, beam, plated box or coil cans and fed through guides, tension control and tow-spreading means.

10. A preform in accordance with claim 4 in which the low modulus fibres may have a modulus in the range of 35 to 175 GPa and the ultra-high modulus fibres may have a modulus in the order of 700 to 900 GPa.

11. A multi-ply carbon fibre fabric, preform or composite material having an ultra-high thermal conductivity in one direction is fabricated by a method in accordance with claim 1.

12. A fabric in accordance with claim 11, subjected to a subsequent heat treatment so that the resulting carbon—carbon composite material has thermal conductivity values in a specific direction in the order of 250 W/mK at temperatures in excess of 500 degrees Celsius.

13. A carbon—carbon composite material in which the thermal conductivity is highly anisotropic so that the ratio of the thermal conductivity in two orthogonal directions is at least 5:1.

14. A carbon—carbon material according to claim 13 in which the thermal conductivity ratio is at least 10:1.

15. A carbon—carbon tile for use in the nuclear fusion industry produced from a multi-ply carbon fibre fabric, preform or composite material manufactured according to claim 1.

16. A carbon—carbon material for use in aircraft brakes produced from a multi-ply carbon fibre fabric, preform or composite material manufactured according to claim 1.

* * * * *